United States Patent
Snead et al.

(10) Patent No.: US 8,714,433 B1
(45) Date of Patent: May 6, 2014

(54) WELDER TRACK RING CLAMP

(71) Applicants: Jamil C. Snead, San Diego, CA (US); Richard D. Traver, San Diego, CA (US)

(72) Inventors: Jamil C. Snead, San Diego, CA (US); Richard D. Traver, San Diego, CA (US)

(73) Assignee: Lincoln Global, Inc., Industry, CA (US)

( * ) Notice: Subject to any disclaimer, the term of this patent is extended or adjusted under 35 U.S.C. 154(b) by 0 days.

(21) Appl. No.: 13/799,758

(22) Filed: Mar. 13, 2013

(51) Int. Cl.
*B23K 37/00* (2006.01)

(52) U.S. Cl.
USPC .......... 228/101; 228/44.5; 228/49.3; 228/212

(58) Field of Classification Search
None
See application file for complete search history.

(56) References Cited

U.S. PATENT DOCUMENTS

| | | | | |
|---|---|---|---|---|
| 2,242,448 A * | 5/1941 | Bucknam et al. | ............... | 266/56 |
| 2,503,055 A * | 4/1950 | Langford et al. | ............. | 269/130 |
| 2,607,092 A * | 8/1952 | Rubly | ......................... | 24/274 R |
| 3,135,850 A * | 6/1964 | Scheiler et al. | ............. | 219/60 A |
| 3,196,245 A * | 7/1965 | Nelson et al. | ............... | 219/60 A |
| 3,209,118 A * | 9/1965 | Dyer et al. | .................... | 219/60 A |
| 3,409,752 A * | 11/1968 | Henderson et al. | ......... | 219/60 A |
| 3,705,453 A * | 12/1972 | Olson | ............................. | 29/256 |
| 3,765,636 A * | 10/1973 | Burrell et al. | ................. | 248/313 |
| 3,800,116 A * | 3/1974 | Tanaka et al. | ............... | 219/60 A |
| 3,910,480 A * | 10/1975 | Thatcher | ........................ | 228/45 |
| 3,920,232 A * | 11/1975 | Clark | .............................. | 269/25 |
| 3,928,919 A * | 12/1975 | Thatcher | ......................... | 33/626 |
| 4,177,913 A * | 12/1979 | Iwamoto et al. | .................. | 228/9 |
| 4,250,813 A * | 2/1981 | Slavens et al. | ................. | 104/118 |
| 4,336,436 A * | 6/1982 | Dubovetsky et al. | ........... | 219/61 |
| 4,356,615 A * | 11/1982 | Dearman | ......................... | 29/525 |
| 4,365,132 A * | 12/1982 | Kazlauskas et al. | ......... | 219/60 A |
| 4,373,125 A * | 2/1983 | Kazlauskas | ................. | 219/60 A |
| 4,597,335 A * | 7/1986 | Slavens | .......................... | 104/118 |
| 4,666,138 A * | 5/1987 | Dearman | ......................... | 269/43 |
| 4,726,300 A * | 2/1988 | Kazlauskas | .................... | 104/118 |
| 5,165,148 A | 11/1992 | Fleischer et al. | | |
| 5,165,160 A * | 11/1992 | Poncelet | ......................... | 29/464 |
| 5,186,755 A | 2/1993 | Carlson et al. | ................ | 118/641 |
| 5,197,768 A * | 3/1993 | Conner | ......................... | 285/105 |
| 5,223,686 A | 6/1993 | Benway et al. | | |
| 5,944,248 A * | 8/1999 | Van Heuveln | .................. | 228/45 |
| 6,325,277 B1 * | 12/2001 | Collie | ........................... | 228/212 |
| 8,481,882 B2 * | 7/2013 | Kastelein et al. | ........... | 219/60 A |
| 2004/0035171 A1 * | 2/2004 | Gormany | ........................ | 72/125 |
| 2009/0050613 A1 * | 2/2009 | Prasek | ........................ | 219/130.1 |
| 2010/0051586 A1 | 3/2010 | Guerrina et al. | | |
| 2013/0008881 A1 * | 1/2013 | Berbakov | ....................... | 219/136 |
| 2013/0126494 A1 * | 5/2013 | Miller et al. | ............... | 219/124.1 |

FOREIGN PATENT DOCUMENTS

| | | | |
|---|---|---|---|
| DE | 102008017447 A1 | | 10/2009 |
| JP | 59-232698 A | * | 12/1984 |
| JP | 2004108593 A | | 4/2004 |

OTHER PUBLICATIONS

BUG-O Systems, Rails and Attachments, Brochure No. LIT-R&A-BRO-0812, www.bugo.com, USA.

* cited by examiner

*Primary Examiner* — Kiley Stoner
(74) *Attorney, Agent, or Firm* — Calfee, Halter & Griswold LLP

(57) ABSTRACT

Exemplary embodiments of welding track clamps are disclosed herein. These track clamps provide several new features including, without limitation, alternate methods and apparatuses for adjusting clamping force and assemblies that provide for increased clamping force for rigidity and stability of welding tracks. The invention further provides ease of use and assembly/dissassembly.

19 Claims, 6 Drawing Sheets

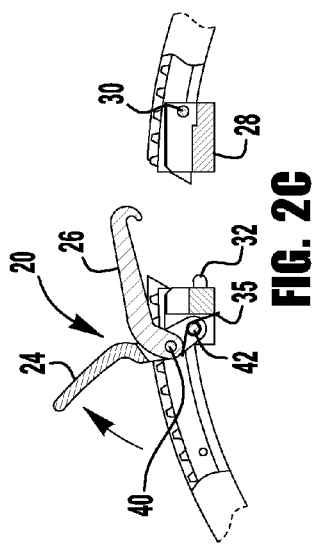
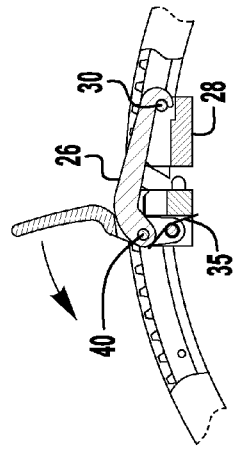
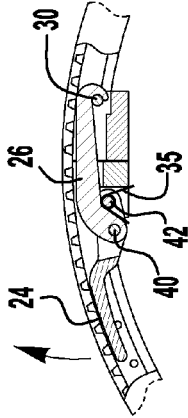
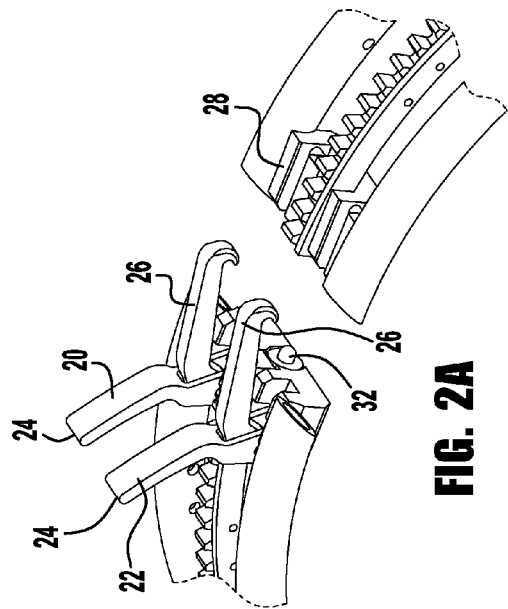
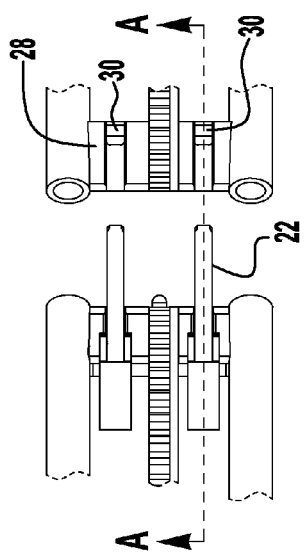

WELDER TRACK RING CLAMP

TECHNICAL FIELD

The present invention relates generally to tracks used by robotic or automatic welding devices or welders to traverse any objects to be welded, such as pipes or parts of a windmill blade. The welding device grips or is mounted on the track and is driven usually by a motor along the track while performing a welding operation.

BACKGROUND OF THE INVENTION

Tracks are comprised of separate segments that are connected together to form a path for an automatic or robotic welder. The type of welder that traverses a track while performing a welding operation is sometimes called an orbital welder or a welding "bug." A complete track may be in the shape of a circle. Such a circle can be used to weld two pieces of pipe together. Complete tracks can also be in shapes other than circles and can be in a straight line. A single complete track, for example a ring for welding pipe segments together, must often be separated into pieces or segments in order to mount the track or remove the track from the pipe. Accordingly, attaching and detaching track segments can be laborious and time-consuming. In addition, any reduction of time in attaching or reattaching track segments will result in a welding operation that has increased productivity and efficiency. Further, it is advantageous to mount a welding track on an object to be welded with sufficient rigidity so that the track does not wobble or become misaligned on the object to be welded. Thus, minimal movement in the track or by the track segments during a welding operation is desirable.

SUMMARY

Exemplary embodiments of welding track clamps are disclosed herein. These track clamps provide several new features including, without limitation, alternate methods and apparatuses for adjusting clamping force and assemblies that provide for increased clamping force for rigidity and stability of welding tracks. The invention further provides ease of use and assembly/disassembly.

BRIEF DESCRIPTION OF THE DRAWINGS

These and other features and advantages of the present invention will become better understood with regard to the following description and accompanying drawings in which:

FIG. 2A is a perspective view of an exemplary embodiment of a clamping assembly of the present invention;

FIG. 2B is a top view of the exemplary embodiment depicted in FIG. 2A;

FIGS. 2C, 2D and 2E are section drawings of the exemplary embodiment of FIG. 2A through Line A of FIG. 2B;

DETAILED DESCRIPTION

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning.

Figure 1B:
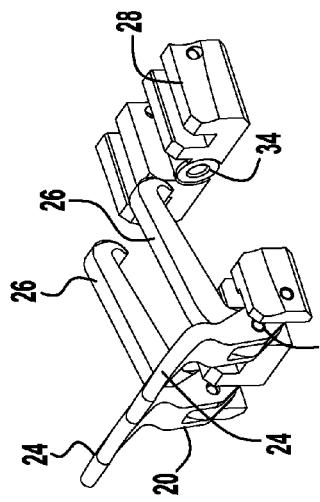
FIGS. 1A and 1B are perspective views of an exemplary embodiment of a clamp assembly of the present application.
Figure 1C:
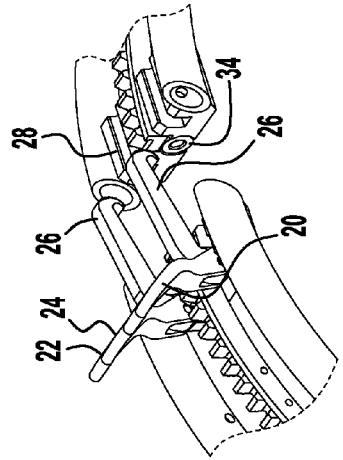
FIG. 1C is a perspective view of the clamping assembly of FIGS. 1A and 1B un-mounted.
Figure 1A:
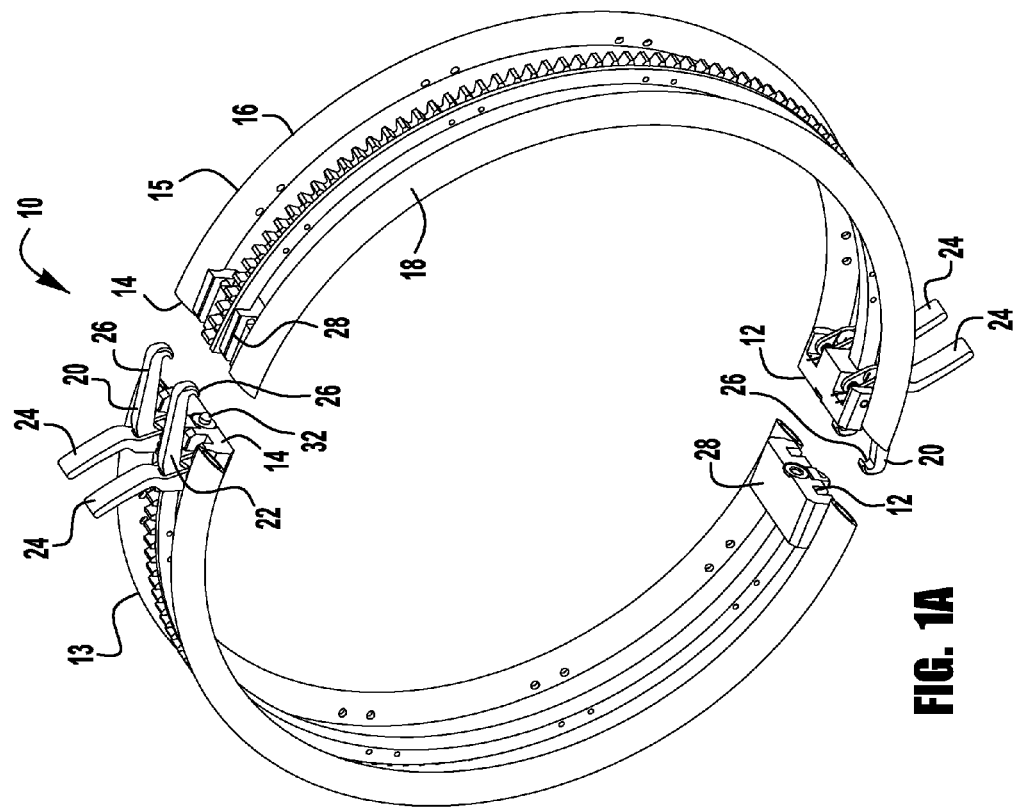
Figure 3C:
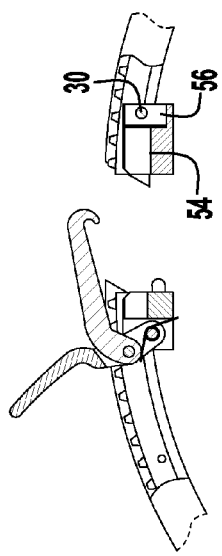
FIGS. 3C, 3D and 3E are section drawings of the exemplary embodiment of FIG. 3A through Line A of FIG. 3B.
Figure 3D:
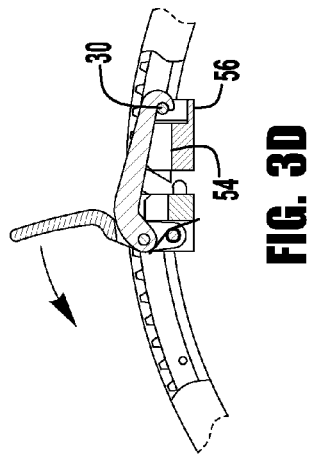
Figure 3E:
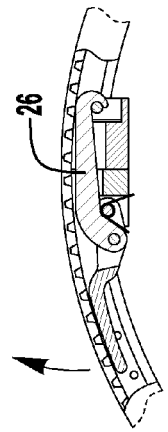
Figure 3A:
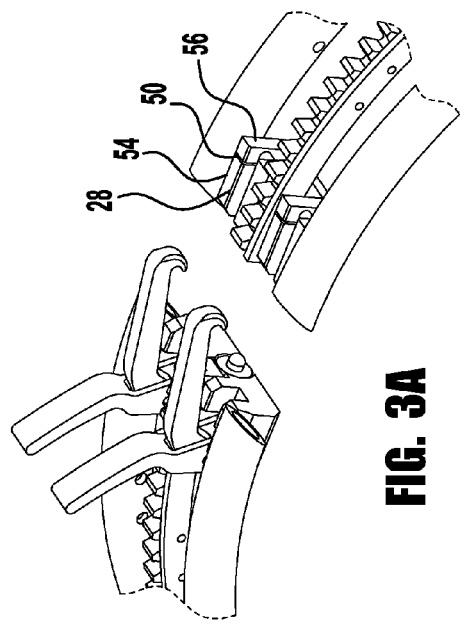
FIG. 3A is a perspective view of an exemplary embodiment of a clamping assembly of the present invention.
Figure 3B:
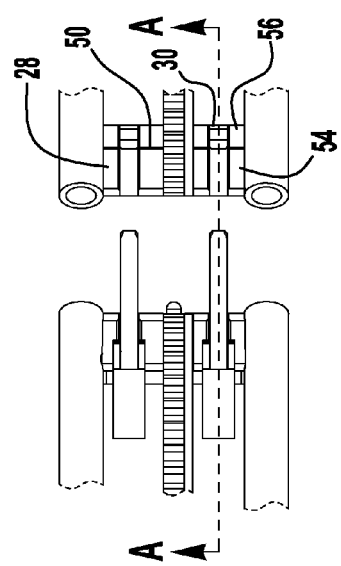
FIG. 3B is a top view of the exemplary embodiment depicted in FIG. 3A.

Referring now to FIGS. 1A and 1B, a two-segment track 10 in a ring shape is shown. Although this embodiment is shown as having only two track segments 13, 15 and is in the shape of a ring for illustrative purposes only, the invention is not limited to any set number of track segments or track shapes. Indeed, the complete track assembly can have any number of shapes including, without limitation, oval, square, rectangle, etc., and can also be in a straight line. As can be seen, each track segment 13, 15 has two ends 12, 14 and two sides 16, 18, respectively. There are also two latch assemblies 20, 22 mounted at one end 12, 14 of each track segment 13, 15. This is where the ends of the two track segments are clamped or attached together to form the ring shape. While this embodiment shows two latch assemblies at one end of each of the track segments and at each interface of the two track segments, a single latch assembly or more than two latch assemblies could be mounted and used at the interface of the two track segments.

Each latch assembly 20, 22 includes a handle 24 and a latch member 26. The handle 24 of each latch assembly can be used to move its respective latch member 26. As can be seen, the latch members 26 shown in FIGS. 1A through 1C are hook-shaped, or J-shaped. The latch assemblies and housing described herein are manufactured from any metal, such as steel, stainless steel, titanium, aluminum or alloys of any metals. The choice of metal used may depend upon the environment or applications in which the clamps are used and the properties that are desired for such environments or applications; for example, corrosion resistance, high strength, lightweight, etc.

Each track segment also includes a housing 28 mounted at one end of the track segment 12, 14 that is opposite the end of the track segment 12, 14 to which the latch assemblies 20, 22 are mounted. Each housing 28 includes a steel pin 30 (not shown in FIGS. 1A-1C) that engages with the latch members 26 when the latch is operated to a closed position to clamp or hold track segments 13, 15 together. Pin housings 28 and latch assemblies are fixed to track segments 13, 15 by welding but could be attached by any other known means including using fasteners or by simply machining the housing or assemblies as part of the track itself. FIG. 1C depicts a latch assembly 20, 22 and housing 28 in space or not mounted to a track segment for illustration purposes.

In the embodiment shown in FIGS. 1A through 1C, each track segment may also include a guide pin 32 and a guide-pin hole or opening 34. The guide pin 32 and the guide-pin opening 34 are used to properly align the latch assemblies 20, 22 with the pin 30 in housing 28 to allow alignment and rigidity of the track assembly when the track is clamped around two pipe sections or pieces for welding. The guide pin opening or hole 34 could be located within the track segment 13, 15 itself or located within housing 28.

Referring now to FIGS. 2A, 2B, 2C, 2D and 2E, another exemplary embodiment of the invention is shown. In this embodiment, a spring 35 is added to each latch assembly 20, 22. The operation of latch assemblies 20, 22 is shown in FIGS. 2C through 2E, which depict a section of latch assembly 22 through section line A. For each latch assembly 20, 22, latch member 26 is mounted to latch handle 24 on a pivot pin 40. In turn, latch handle 24 is mounted and rotates on another pivot pin 42, which is formed in or mounted in each of the bodies of latch assemblies 20, 22. As can be seen in FIG. 2C, spring or resilient member 35 urges the handle 24 upward and to rotate around pivot pin 42 in the direction of the arrow in FIG. 2C. The resilient force acts between the handle 24 and a body in the latch housing. This allows easy grasping and use of handle 24. Spring 35 is shown in the drawings as a coil spring wound around pivot pin 42 but could be replaced by any resilient member or spring, including an elastomer or rubber body or spring.

In operation, as can be seen in FIGS. 2C, 2D and 2E, the handle 24 is grasped by the user and rotated around pivot pin 42 until latch member 26 is placed in engagement with pin 30 on housing 28. At this point, the track segments are placed around the pipe sections to be welded. The unlatched state of latch assembly 22 is shown in FIG. 2C, and the "hooked" or partially engaged condition is shown in FIG. 2D. Then, the handle 24 is pressed or pulled by the user in a direction shown by the arrow in FIG. 2D until the fully-latched or clamped position is reached in FIG. 2E. In this position, the two track segments are firmly and rigidly clamped around the pipe or pipe segments to be welded. Further, the alignment pin 32 and opening 34 are engaged to assure complete alignment of the welding track. To disengage the latch assembly 22, the handle is simply pulled upward away from the track segment in the direction of the arrow shown in FIG. 2E.

In another embodiment depicted in FIGS. 3A, 3B, 3C, 3D and 3E, housing 28 is shown including an opening, slit or groove 50 formed within it. The groove 50 is only formed partially through the housing 50 and does not divide it completely into two separate pieces, but does divide it into two connected portions 54 and 56. The groove 50 causes there to be some resilient movement between portions 54 and 56 of housing 28. This movement upon clamping or latching shown in FIG. 3E allows pin 30 to move a slight amount. This slight movement allows the housing portion 56 and pin 30 to move with respect to track ring segment 13, 15 upon which they are mounted so that any variation in parts due to manufacturing tolerances or wear and tear that could cause over-tightness or over-clamping can be accounted for by the resilient action resulting from the groove 50 in the housing 28. In addition, the placement and the size of groove 50 in housing 28 can be tailored or adjusted to only allow specific and maximum clamping forces to be applied between clamping mechanism 20, 22 and housing 28. The opening 50 can also be of a shape other than a groove.

Figure 4C:
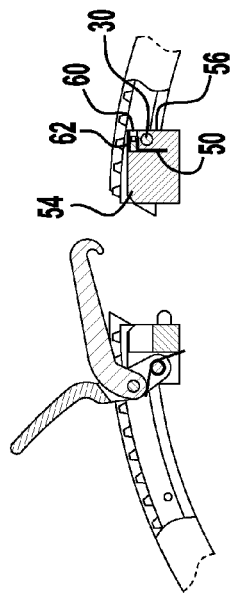
FIGS. 4C and 4D are section drawings of the exemplary embodiment of FIG. 4B through Line A of FIG. 4B.
Figure 4D:
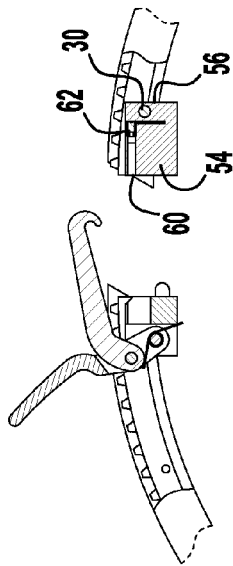
Figure 4A:
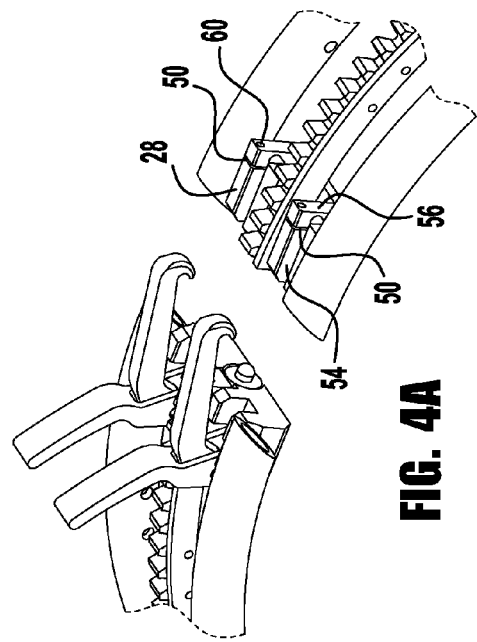
FIG. 4A is a perspective view of an exemplary embodiment of a clamping assembly of the present invention.
Figure 4B:
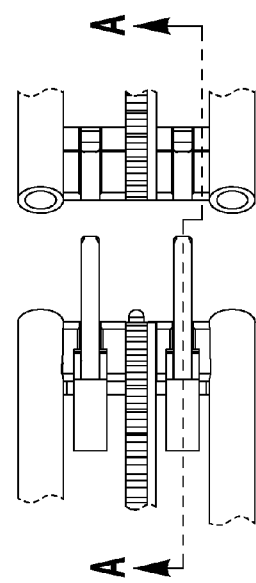
FIG. 4B is a top view of the exemplary embodiment depicted in FIG. 4A.
Figure 9:
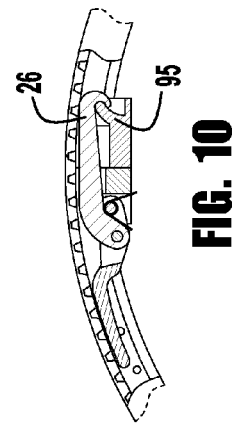
FIG. 9 is a section drawing of an exemplary embodiment of a clamping assembly of the present invention along a Line A of the same type of Line A as shown in FIG. 4B.

In another exemplary embodiment depicted in FIGS. 4A, 4B, 4C and 4D, the housing 28 may also include an opening or groove 50 as shown in FIGS. 3A through 3E, but in addition include a threaded opening 60 for a set screw 62 or any other threaded fastener. Set screw 62 can then be used to adjust the actual length of housing 50 by exerting force between parts 54 and 56. This adjustment or variation in length of housing 50 allows the clamping force of the latch mechanism to be adjusted, and therefore, the clamping force used to hold together two track segments to be adjusted. The adjustment is effected by rotating set screw 62 toward or away from and against portion 54 of the housing 50 in FIG. 4C. As set screw 62 of presses against portion 54, it moves portion 56 with pin 30 further away from latch assembly 20, thus increasing the clamping force of latch assembly 20. The clamping force can be reduced by rotating set screw 62 the other way. FIG. 4D depicts another embodiment in which the portion 54 includes a threaded opening 60 and a set screw 62. This embodiment operates in the same manner as the assembly shown in FIG. 4C except that the set screw is in portion 54 and is adjusted against portion 56 to again move portion 56 toward or away from latch assembly 20. In either of these exemplary embodiments, a conventional screw (other than a set screw which is below the outside surface of either of portions 54 or 56) or any other threaded fastener could also be used with a head that protrudes out above the outside surfaces of portions 54 or 56. This is depicted in FIG. 9 with screw 90.

Figure 5C:
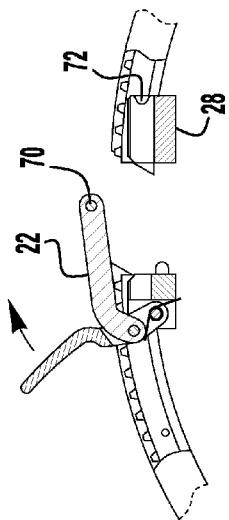
FIGS. 5C, 5D and 5E are section drawings of the exemplary embodiment of FIG. 5B through Line A of FIG. 5B.
Figure 5D:
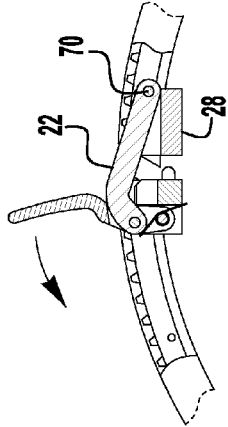
Figure 5E:
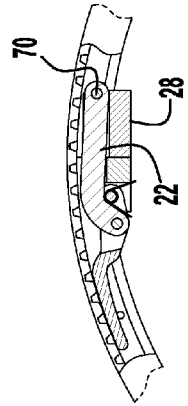
Figure 5A:
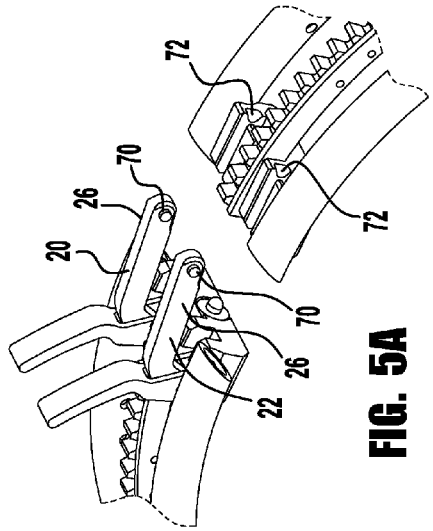
FIG. 5A is a perspective view of an exemplary embodiment of a clamping assembly of the present invention.
Figure 5B:
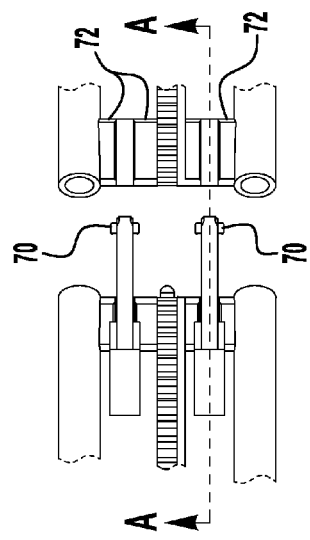
FIG. 5B is a top view of the exemplary embodiment depicted in FIG. 5A.
Figure 6:
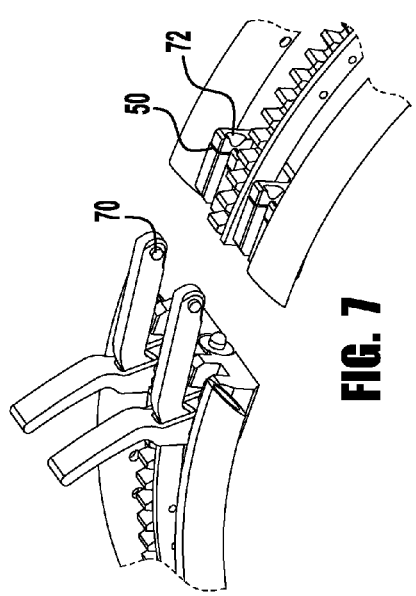
FIG. 6 is a perspective view of an exemplary embodiment of a clamping assembly of the present invention un-mounted.

In yet another exemplary embodiment depicted in FIGS. 5A, 5B, 5C, 5D and 5E, the hook shape, or J-shape, of the latch member is replaced with a latch member having a pin 70 mounted therein resulting in a T-shaped latch member. The pin can be formed or machined into latch members 26 or have a separate pin mounted in a hole in the latch member 26. The pin 70 is substantially perpendicular to the elongated sides of the latch members 26, as shown in FIGS. 5A and 5B. The pins 70 fit into complimentary depressions or pockets 72 formed in housing 28 (instead of pins as shown in FIGS. 1A through 1C). Thus, to engage the latch, the handle 24 of the latch assembly 20 is again rotated in the direction of the arrow shown in FIG. 5C, and the pins 70 are then placed into depressions 72. Then, the handle 24 is rotated in the direction of the arrow shown in FIG. 5D until the latch assembly is clamped or latched as shown in FIG. 5E. In this exemplary embodiment, the pin 70 could be replaced with any protrusion on the end of latch members 26. This protrusion may be generally perpendicular to the latch members 26. For example, a ball-shaped protrusion could be used in place of pin 70. FIG. 6 depicts the latch assemblies 20, 22 and housing 28 of this embodiment in space without being attached to track segments. The T-shape of the latch member shown in FIGS. 5A through 5E can normally be used with and withstand greater clamping forces than a J-shaped or hook-shaped latch member.

Figure 7:
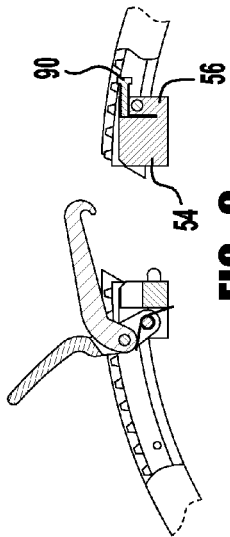
FIG. 7 is a perspective view of an exemplary embodiment of a clamping assembly of the present invention.
Figure 8:
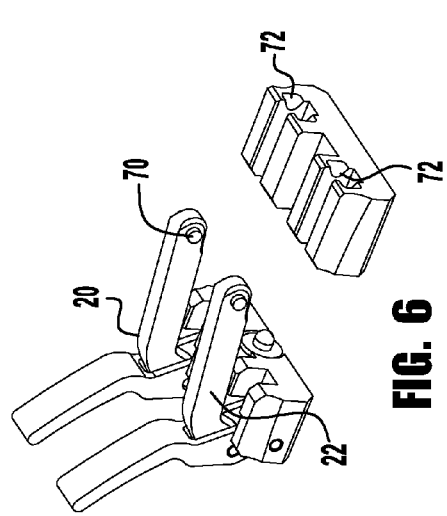
FIG. 8 is a perspective view of an exemplary embodiment of a clamping assembly of the present invention.
Figure 10:
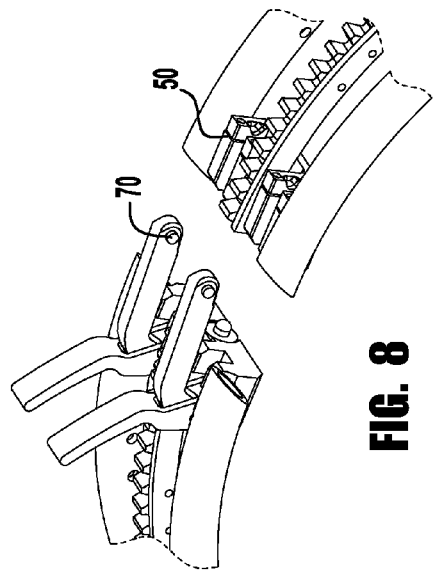
FIG. 10 is a section drawing of an exemplary embodiment of a clamping assembly of the present invention along a Line A of the same type of Line A as shown of FIG. 5B.

Any of these embodiments and features of the embodiments can be combined or modified to create additional embodiments and are still within the spirit and scope of this invention. For example, a T-shaped latch member may be used with a grooved housing and/or a housing having an adjustable set screw feature as shown in FIGS. 7 and 8. In addition, in any of the exemplary embodiments in which a J-shaped latch member 26 is used, the pin 30 and housing 28 could be replaced by a housing 28 that has a protrusion 95 for catching the hooked member 26, which is shown by way of example in FIG. 10.

The latch assemblies described herein and their substantially parallel arrangement with the track segments and their placement within the sides 16, 18 or envelope of the track provide maximum clamping force, ease of use and eliminate wasted space of clamps that are mounted outside the sides of the track or outside the track envelope.

While the present invention has been illustrated by the description of embodiments thereof and while the embodiments have been described in considerable detail, it is not the intention of the applicants to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus and illustrative examples shown and described. Accordingly, departures may be made from such details without departing from the spirit or scope of the applicants' general inventive concept.

The invention claimed is:

1. An assembly for welding comprising:
   a first welding track segment and a second welding track segment;
   each said first and second welding track segments having two sides and at least one end;
   a latch member mounted to the at least one end of said first welding track segment;
   a housing mounted to the at least one end of said second welding track segment for engagement with said latch member;
   said housing divided into a first portion and a second portion resiliently connected to each other for adjustment of the clamping force used to engage the latch member with the housing; and
   a welding device attachable to one of said first or second welding track segments.

2. The assembly of claim 1 wherein said housing is divided by a groove.

3. The assembly of claim 1 wherein said housing further comprises a threaded fastener, set screw or screw mounted in one of said first portion or second portion for adjusting the length of the housing.

4. The assembly of claim 1 wherein said latch member is mounted inside of the two sides of said first welding track segment.

5. The assembly of claim 1 wherein said latch member is J-shaped.

6. The assembly of claim 1 wherein said latch member is T-shaped.

7. The assembly of claim 1 wherein said housing has a pin or protrusion for engagement with the latch member.

8. The assembly of claim 1 wherein said housing has a depression for engagement with the latch member.

9. The assembly of claim 1 wherein said assembly further comprises a resilient member for urging said latch member to an open position.

10. The assembly of claim 1 wherein said assembly further comprises a handle for moving said latch member.

11. The assembly of claim 1 wherein said assembly further includes a guide assembly.

12. The assembly of claim 11 wherein said guide assembly comprises a guide pin on said at least one end of one of said first and second welding track segments.

13. A welding apparatus comprising:
    a first welding track segment and a second welding track segment;
    each said first and second welding track segments having two sides and at least one end;
    a means for connecting said at least one end of each of said first and second welding track segments together comprising a T-shaped latch member;
    a means mounted on one of said first or second welding track segments comprising a housing having a first portion resiliently connected to a second portion for adjusting the clamping force used to hold said first and second welding track segments together; and
    a welding device mounted to said first or second welding track segments.

14. The assembly of claim 13 wherein said means for adjusting the clamping force further comprises a groove.

15. The assembly of claim 13 wherein said means for adjusting the clamping force further comprises a set screw for adjusting the length of the housing.

16. The assembly of claim 13 wherein said means for adjusting the clamping force is connected inside of the two sides of said first welding track segment.

17. The assembly of claim 13 wherein said T shaped latch member is mounted to a pivot.

18. The assembly of claim 13 wherein said means for connecting further comprises a resilient member for urging said T-shaped latch member to an open position.

19. A method for welding comprising:
    providing a latch member on a first welding track segment;
    providing a housing on a second welding track segment;
    automatically adjusting the clamping force used to hold the first and second welding track segments together by operation of said latch member latching into said housing and said housing comprising two portions that are resiliently movable with respect to each other;
    connecting the two welding tracks together by latching the latch member to the housing; and
    attaching welding devices to said first or second welding tracks.

* * * * *